April 5, 1949.　　　P. KETELSEN ET AL　　　2,466,246
LUBRICATOR FOR AIR AND GAS LINES
Filed May 24, 1945
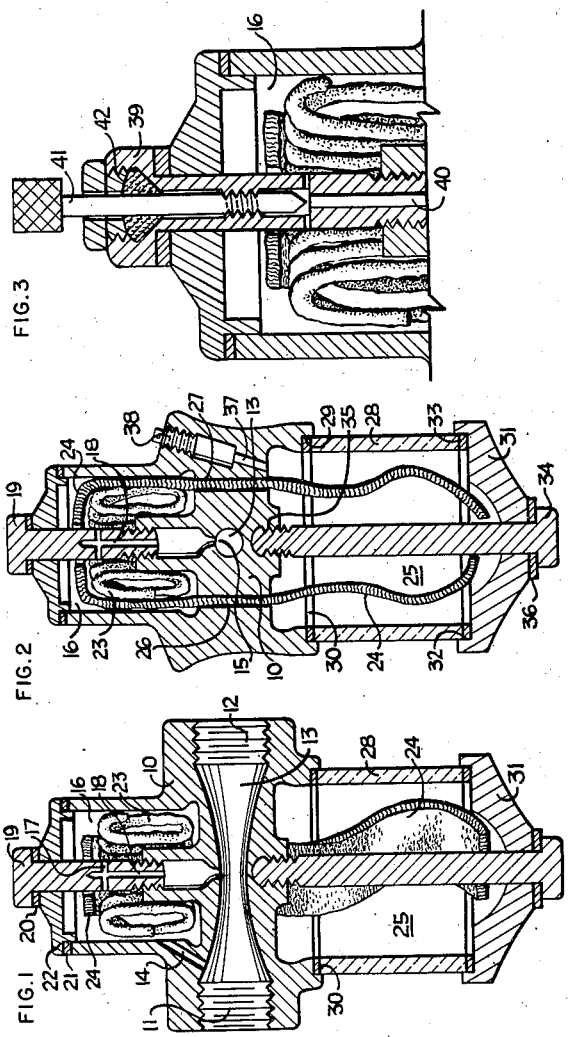
PETER KETELSEN
HARRY L. GIWOSKY
INVENTORS
BY *Hubert Miller*
ATTORNEY Patented Apr. 5, 1949

2,466,246

UNITED STATES PATENT OFFICE 2,466,246

LUBRICATOR FOR AIR AND GAS LINES

Peter Ketelsen and Harry L. Giwosky, Wichita, Kans., assignors to Boeing Airplane Company, Wichita Division, a corporation of Delaware Application May 24, 1945, Serial No. 595,602

4 Claims. (Cl. 184—55)

This invention relates to improvements in lubricators, and more particularly to a new type lubricator adapted for connection into a compressed air or vacuum air line for delivering a desired quantity of oil into the air passing through the line.

Lubricators of this class have long made use of Venturi principle to draw oil from a reservoir into the air line, the air stream thus conducting the oil to the mechanism or parts to be lubricated. Due to variations in air flow velocity and pressure, however the amount of oil delivered into the air stream by this type of lubricator is very erratic, even though the best known type of valve is used to control oil delivery.

It is the chief object of this invention to provide an air line lubricator which affords extremely accurate regulation of the amount of oil delivered into the air line; which eliminates the delivery of excess oil at one moment and an inadequate amount the next moment by providing a continuous though small volume delivery of oil into the air line during air flow; and which also eliminates the accumulation or dripping of oil into the air line during the time air is not flowing through the line.

Another object is to provide a lubricator in which the aspirating effect produced by the Venturi tube does not act directly to draw oil from the reservoir into the air line, as is usual and common, but in which this aspirating effect is used to by-pass air through a chamber separate from the oil reservoir, and through a maze type oil saturated absorbent cartridge in that chamber, and from which cartridge the by-passed air mechanically entrains minute droplets of oil and carries them into the main air stream.

Another object of the invention is to provide a lubricator which does not depend on pulsations in the air line pressure nor on the force of gravity to deliver oil from the reservoir into the air line—but which can be made to deliver a desired quantity of oil into the air line whether air is flowing through the line at high velocity or at low velocity, whether the flow is interrupted frequently or is continuous.

Another object is to provide a lubricator which includes a novel and efficient method and means for delivering and for controlling the delivery of oil into an air line.

Generally speaking, a lubricator embodying my invention includes a Venturi tube for direct connection into an air line, an associated depending oil reservoir having no direct communication with the Venturi tube, an associated air chamber located above the level of the oil reservoir, a maze type absorbent cartridge in the air chamber, a wick having its lower end in the oil reservoir and its upper end in contact with the absorbent cartridge for lifting oil from the reservoir and carrying it to the absorbent cartridge by capillary action, and at least two air by-pass ducts affording direct communication between the Venturi tube and the air chamber only, one at a high pressure point in the Venturi tube and the other at a low pressure point, to induce a flow of air from the air line over and through the maze type absorbent cartridge and back into the air line as oil laden air.

The details in the construction of a preferred embodiment of the invention together with other objects attending its use will be better understood after the following detailed description is read in connection with the accompanying drawings, which are presented for illustrative purposes only, and which are not to be construed as limiting the scope of the invention.

In the drawings:

Figure 1 is a central vertical section taken longitudinally through the Venturi tube of a lubricator embodying my invention;

Figure 2 is a central vertical section taken at right angles to the Figure 1 view;

Figure 3 is an enlarged fragmentary view similar to Figure 1, showing the details of a different type means for controlling delivery of oil into the air line; and Figure 4 is a view similar to Figure 1 but illustrates a different type lubricator embodying the invention.

In the embodiment illustrated, the lubricator body 10 is connected into an air line (not shown) by means of the threaded connections 11 and 12. This makes the Venturi air passage 13 a part of the air line. Air flows from the end 11 toward the end 12, creating a high pressure zone adjacent the duct 14 and a low pressure zone adjacent the duct 15. This pressure differential induces air to flow out of the air line through duct 14 into a chamber 16, out through ducts 17 and 18, and back into venturi 13 through the duct 15. For any constant pressure differential between the two mentioned zones, the volume flow of air into and out of this chamber 16 is determined by the cross sectional area of the smallest of ducts 18. Since this duct (as well as the duct 17) is formed in a removable bolt 19, the volume flow of air through the upper chamber can be varied by replacing the bolt 19 with one having a duct 18 which is larger or smaller in cross sectional area, as desired.

In addition to serving the mentioned purpose, the bolt 19 and the gaskets 20 and 21 together serve to seal the cap 22 in position on the open end of chamber 16. Inside this chamber, and occupying a major portion of it, is a maze type absorbent cartridge 23 which may be made of cotton fibers bound in twisted wire, similar to the manner in which an ordinary pipe cleaner is made. This material is bent to form a loose coil around the bolt 19, and when formed it has a relatively large surface area for contact by air flowing through the chamber.

This cartridge 23 is kept saturated with oil by means of a wick 24, preferably positioned as shown in Figure 2, with its upper end in intimate contact with the cartridge 23, and its lower ends extending into an oil reservoir 25 through slots 26 and 27 (Figure 2) in the body 10. The reservoir is formed in a conventional manner, preferably by means of a transparent or translucent tube 28, the upper end of which fits a seat 29 formed in the body 10, a seal being provided by a gasket 30. The tube 28 is removably held on its seat 29 by a closure 31 which is provided with a similar seat 32 and a gasket 33 for sealing against the lower end of the tube. The closure 31 is in turn held in place by a bolt 34, the threaded end of which screws into the body 10 at 35. A gasket 36 seals around the bolt hole in the closure. The reservoir may be filled through a duct 37, the outer end of which is normally closed by a plug 38.

It will be understood by those familiar with the art that capillary action of the wick 24 will keep the absorbent cartridge 23 in a substantially saturated condition. It will also be understood that the pressures in the two chambers 16 and 25 will be equal at all times due to the direct communication between them by means of the wick slots 26 and 27, and also due to the fact that there is no direct communication between the reservoir 25 and the venturi 13. Consequently no oil can drip or run into, or be aspirated into the air line direct from the oil reservoir. Nor can oil drip or run into the Venturi air line 13 from the chamber 16; first, because oil cannot accumulate in a body in this chamber; and second, because if a small amount did accumulate in the bottom of this chamber it could not run out through the ducts 14 or 15 because their openings are well above the bottom of the chamber.

The only manner in which oil can reach the air line is for it to be carried into that line by the air which flows through the chamber 16. This by-passed air, in passing through and around the cartridge 23 at relatively high velocity, mechanically entrains extremely minute droplets of oil from the large exposed surface area of the cartridge, and carries this oil in the form of a fine mist through the ducts 17, 18, and 15, and into the air line. Since the amount of oil actually entrained by this by-passed air is so small in proportion to the volume of air flowing through the chamber, a very fine control of the amount of oil delivered into the air line can be obtained simply by varying the permitted volume flow of air through the chamber.

As previously mentioned, this is done by choosing a duct 18 of the proper cross sectional area. If preferred, of course, the size of duct 17 could be varied instead, or both could be made the same size. At any rate the ducts 14 and 15 should be made sufficiently large to permit maximum air flow which will ever be desired. The ducts in the bolt 19 are then used to modify this maximum flow.

The lubricator illustrated in Figure 3 is identical to the one thus far described except that a different type bolt 39 is substituted for the bolt 19. The bolt 19 is counterbored through its head to the upper end of the air-oil duct 40, and is fitted with a needle valve 41 which serves to regulate air flow through the duct 40 in a well known manner. A conventional packing gland 42 prevents air leakage around the valve stem 41. With this arrangement volume air flow through the chamber 16 can be easily and quickly regulated without the necessity of replacing the bolt, as in the previously described embodiment. However, the embodiment of Figures 1 and 2 has the advantage of preventing several different workmen who work on a single machine tool from varying the oil feed to suit their individual tastes, regardless of the actual requirements of the machine. The lubrication requirements of the tool can first be determined and the proper duct size chosen. Thereafter the operator cannot modify that feed to supply either excess or insufficient oil to the machine.

In the Figure 4 embodiment, the separate oil reservoir 25 of the other embodiments, is entirely eliminated, and the lower part of the upper chamber 43 is used in its place. The wick 24 is also eliminated, since the lower portion of the absorbent cartridge 44 is immersed in oil. The duct 14 is replaced by a duct 45 which opens into the chamber 43 at a considerably higher point, thus eliminating any possibility of oil running into the air line from this chamber. For the same reason the heighth of the boss 46 has been increased. The principle of operation is identical to that previously described with respect to the other embodiments. If a greater exposed surface area of the absorbent cartridge is desired, the heighth of the entire chamber 43 as well as that of the cartridge 44 may be increased.

From the above description it will be seen that we have provided a lubricator which eliminates the feeding of excess oil into an air line, yet which will feed a very large quantity of oil into the line if such is desired, by the simple expedient of increasing the cross sectional area of the air flow ducts. It will be understood by those familiar with the operation of Venturi tubes that a very large volume of air can be by-passed through the upper chamber through very small ducts—of the order of .01" to .035". We have resorted to details of structure and association of parts for the purpose of making the invention understandable. It is to be understood, however, that such structure may be modified within the broader scope of the invention as defined by the appended claims.

We claim:

1. A lubricator for introducing oil into an air line comprising: a body including a Venturi tube adapted for direct connection into an air line; an air by-pass chamber formed in said body, the Venturi tube wall separating the two; a removable closure for sealing said by-pass chamber; a bolt for securing said closure in position; an air duct formed in said bolt; an air passage through the Venturi tube wall at a point adjacent the low pressure zone in said Venturi tube, one end of the duct in said bolt being in communication with said air passage, and the opposite end of the duct in said bolt being in communication with the interior of said air by-pass chamber; a separate air duct connecting the interior of said chamber with a high pressure zone in said Venturi tube, whereby air flow through said Venturi tube induces air flow through the by-pass chamber; and an oil impregnated maze type absorbent cartridge in the by-pass chamber for supplying oil in minute quantity to the air which flows through said chamber.

2. A lubricator for introducing oil into an air line comprising: a body including a Venturi tube adapted for direct connection into an air line; an air by-pass chamber formed in said body, the Venturi tube wall separating the two; a removable closure for sealing said by-pass chamber; a bolt for securing said closure in position; an air duct formed in said bolt; an air passage through the Venturi tube wall at a point adjacent the low pressure zone in said Venturi tube, one end of the duct in said bolt being in communication with said air passage, and the opposite end of the duct in said bolt being in communication with the interior of said air by-pass chamber; a separate air duct connecting the interior of said chamber with a high pressure zone in said Venturi tube, whereby air flow through said Venturi tube induces air flow through the by-pass chamber; an oil impregnated maze type absorbent cartridge in the by-pass chamber for supplying oil in minute quantity to the air which flows through said chamber; an oil reservoir located at a level lower than the Venturi tube and lower than said air by-pass chamber; and a wick extending from said reservoir into said by-pass chamber and serving as the sole means for maintaining said absorbent cartridge impregnated with oil, there being no direct communication between said reservoir and said Venturi tube.

3. A lubricator for introducing oil into an airline comprising: A body having a Venturi shaped air passage formed therein for direct connection into an airline; an air by-pass chamber carried by said body, the Venturi wall separating the two; air ducts connecting the by-pass chamber at two spaced points with a high and low pressure zone respectively in the Venturi air passage, whereby forced air flow through the venturi induces secondary air flow through the by-pass chamber; a separate closed oil reservoir carried by said body; a duct affording direct communication between the reservoir and the air by-pass chamber; and a wick extending from the oil reservoir through said last mentioned duct and into the interior of the air by-pass chamber for feeding oil in minute quantities to the air passing through the chamber.

4. The organization described in claim 3, and means in one of the ducts connecting the air by-pass chamber and the Venturi air passage for varying the volume flow of air through the chamber.

PETER KETELSEN.
HARRY L. GIWOSKY.

REFERENCES CITED

The following references are of record in the file of this patent:

UNITED STATES PATENTS

| Number | Name | Date |
| --- | --- | --- |
| 909,740 | Beckfield | Jan. 12, 1909 |
| 1,013,197 | McQuade | Jan. 2, 1912 |
| 1,091,776 | Spitznas | Mar. 31, 1914 |
| 1,336,905 | Hunzicker | Apr. 13, 1920 |
| 2,223,456 | Medsker | Dec. 3, 1940 |
| 2,245,600 | Medsker | June 17, 1941 |
| 2,304,644 | Heftler | Dec. 8, 1942 |